H. E. GOLDBERG.
CALCULATING MACHINE.
APPLICATION FILED AUG. 28, 1911.
1,061,606.
Patented May 13, 1913.
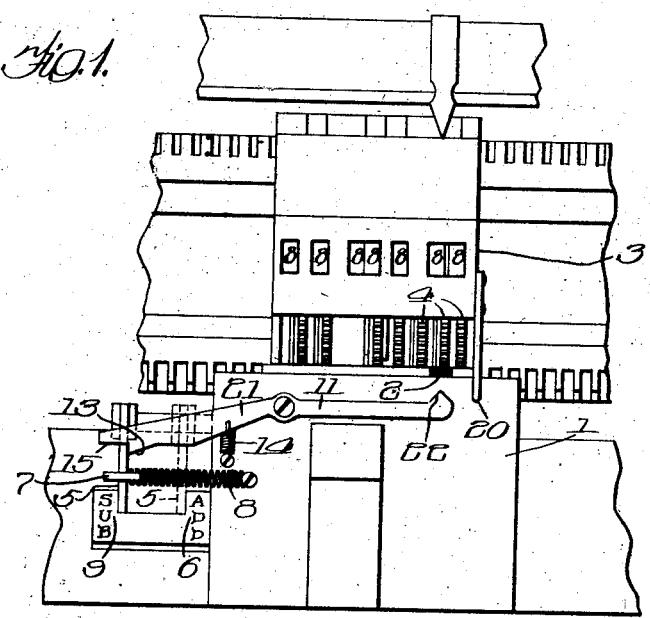
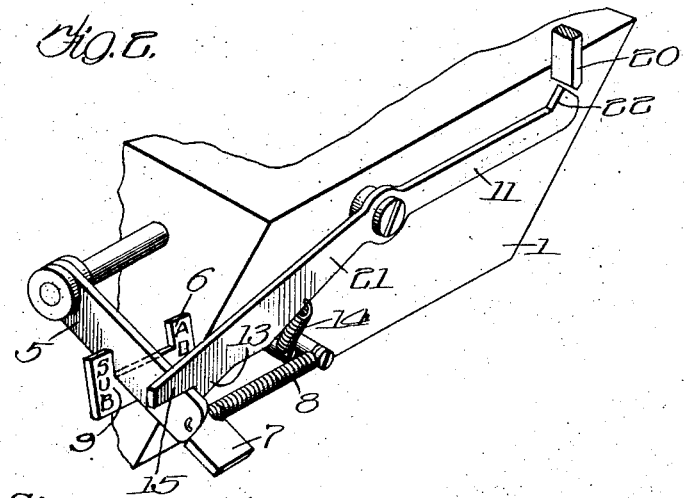
Witnesses:
Inventor:
Hyman Eli Goldberg

UNITED STATES PATENT OFFICE.

HYMAN ELI GOLDBERG, OF CHICAGO, ILLINOIS, ASSIGNOR TO GOLDBERG CALCULATING MACHINE COMPANY, OF CHICAGO ILLINOIS.

CALCULATING-MACHINE.

1,061,606.  Specification of Letters Patent.  Patented May 13, 1913.

Application filed August 28, 1911. Serial No. 646,445.

*To all whom it may concern:*

Be it known that I, HYMAN ELI GOLDBERG, a citizen of the United States, residing at Chicago, in the county of Cook and State of Illinois, have invented certain new and useful Improvements in Calculating-Machines, of which the following is a specification.

My invention is an improvement in calculating machines, and refers more particularly to the easier manipulation of the machine for the correcting of errors made by the operator. It very often happens that the operator inserts a wrong number in the machine and discovers the error after some time. Upon such discovery, he corrects the error by subtracting the wrongly inserted number and adding in its stead the proper number.

In Patent No. 893,719, issued to John C. Wahl, July 21, 1908, is shown a typewriter calculating machine with a framework on which is mounted a master wheel connected to and operated by the keys of the typewriter. Connected to the carriage of the typewriter is a bar upon which is mounted the totalizer. During the operation of the machine, the carriage in its letter space advance travels and carries the totalizer along. The wheels of the totalizer therefore pass over and are *seriatim* engaged and meshed with the master wheel. The rotation of the master wheel produces a corresponding rotation in the particular wheel of the totalizer which at that moment happens to be in engagement therewith. And the particular direction of the rotation of the master wheel determines the direction of the rotation of the totalizer wheel, and therefore determines whether the totalizer shall add or subtract. The calculating mechanism also includes a handle capable of being set in either of two positions, and the particular position of this handle determines the direction of the rotation of the master wheel. The normal or adding position of the handle is its position at the right, and in order to correct an error, that is, to subtract a number, the operator shifts the handle to the left. But it often happens that the operator after shifting the handle to the subtracting position forgets to bring it back again to the adding position after the wrongly inserted number has been subtracted. He therefore now makes a new mistake by subtracting the next few numbers.

The main object of my invention is to automatically bring back the handle from its correcting subtracting position to its normal adding position.

The invention is illustrated by the accompanying drawings of which—

Figure 1 represents a front elevation of some of the parts. Fig. 2 is a perspective view of some of the parts to more clearly illustrate their construction.

For the purpose of explanation of this invention, it is sufficient to point out that 1 represents the framework of the typewriter and calculating machine; 2, the master wheel; 3, the totalizer; 4, the wheels thereof; 5, the handle which is normally kept in its position to the right, adjacent to the extension 6, marked "Add," and which has a finger piece 7 by means of which it is moved, and may be shifted by the operator against the force of the spring 8 out of its previous adding position into its subtracting position, adjacent to the extension 9 marked "Sub" (short for subtraction). The mechanism connecting the handle, the master wheel, the keys, etc., is thoroughly described in the above cited patent and will not be further explained here.

Pivotally mounted upon the framework 1 is a lever 11 which is formed at its left end into a pawl 13. This pawl is given a tendency downward by means of a tension spring 14 fastened with its one end to the lever and with its other end to the framework of the machine. Whenever the operator pushes the finger piece 7 of the handle 5 to the left, thereby bringing it from its adding to its subtracting position, then the pawl 13 under the influence of its spring 14 moves in behind said handle as shown in the figures, and prevents the same from returning under the influence of its spring 8. The lever 11 is prevented from being pulled too far down by the extension 15 upon it striking against the top of the handle 5. Should the lever 11 now be moved against the force of its spring 14, then its pawl 13 becomes disengaged from the handle 5 which thus becomes free to return to its adding position under the influence of its spring 8.

During the operation of the calculating machine, as explained in Patent No. 893,719, the totalizer wheels pass over and engage with the master wheel. As the numbers on this machine are written in the ordinary manner, that is, the highest decimal figures first and the lowest decimal figures last, the act of writing the units figure shows that the number has been finished, and therefore immediately after the writing of the units figure of the number, the handle should be released from its correcting position to bring it back to its previous adding position. Of course the carriage of the typewriter and the totalizer advance one step after the writing of the units figure of a number in the same manner as they advance after the writing of any other figure. Advantage has been taken of this fact to make this particular step of the totalizer automatically release pawl 13 previously described, and this is accomplished in the following manner.

Attached to the totalizer 3 is an extension 20, and forming one piece with the lever 11 is an arm 21 formed at its end into a beveled projection 22, and the parts are so shaped that the projection 20 upon the totalizer comes into contact with the bevel 22 of lever 11 when the master wheel is immediately to the right of the units totalizer wheel. The projection 20 in passing by depresses the bevel 22, therefore moving the lever 11, withdrawing the pawl 13 from the handle 5 which thereupon resumes its normal position. Thus immediately after the insertion of the last figure of the correcting number, the mechanism automatically returns to its adding position.

In the application Serial No. 629,308 filed by John C. Wahl, May 31, 1911, there is shown a handle which normally occupies one position but which may be brought by the operator into another position, whereupon the operation of the calculating machine is reversed. That is, it will now add if it was previously subtracting, or will now subtract if it was previously adding. The function of the handle of that application is similar but more general than the function of the handle of this application. Handle 5, as said above, causes addition while in one position, and causes subtraction while in the other position, a change of position therefore causing a reversing in the machine. The function of the handle of the other application is similar in that it, too, causes a reversing in the machine, due to the change of position in the handle. It is therefore quite evident that the rest of this application, namely, the pawling of the handle in its reversing position and the unlocking of the pawl by means of the totalizer or carriage position applies equally well to both.

It is evident that the extension 20 upon the totalizer need not be fastened to the totalizer directly but might be fastened to the carriage itself. The advantage gained by fastening it to the totalizer directly is that the totalizer may easily be adjusted upon the carriage without needing any special adjustment for the extension 20, which by this construction becomes simultaneously automatically adjusted.

The mechanism has here been described in connection with the Remington typewriter in which the paper moves while the type basket is stationary. It is perfectly evident that my invention may be applied with equal ease to other forms of typewriter and calculating machines, for instance, calculating machines mounted upon a book typewriter like the Elliott-Fisher machine. In the latter, the paper is stationary, and it is the type basket that moves. It is thus seen that the moving part of the machine which is commonly called the carriage may sometimes be a paper-supporting portion, or sometimes a type-bearing portion. But in every calculating machine wherein the figures of a number are inserted successively, it will be found that there is some moving portion which determines the decimal place of calculation, and it is to that moving portion that I wish the word carriage to be applied in the appended claims. This "carriage" may be one piece or composed of several pieces which move in unison with each other but do not necessarily have the same movement. As long as the part moves, and the place of calculation can be determined from the location of that part, the said moving part constitutes the "carriage" in the sense in which the word is employed in the claims. In the machine described in the drawings, the carriage might be the carriage of the typewriter, or might be the bar supporting the totalizer, or in a more limited sense it might be the totalizer itself, or in a still more limited sense it might be the extension 20 forming part of the totalizer.

It is evident that the mechanism could easily be varied without departing from the spirit of my invention. For instance, the spring 14 could easily be removed, its place being taken by gravity. Again, the pawl might be eliminated, and in its stead there might be placed a differently formed piece for 6 and 9 with a notch in it, which notch would serve to retain the handle 5 in its correcting position, until released therefrom.

I claim—

1. In a calculating machine; a carriage to determine the place of calculation; a handle adapted to occupy a normal position for the normal operation of the machine, and a correcting position for the correcting operation of the machine; and means including a part moving with the carriage and operative at a predetermined location thereof to control the handle to move it from its correcting position to its normal position.

2. In a calculating machine; a carriage to determine the place of calculation; a handle adapted to occupy a normal position for the normal operation of the machine, and a correcting position for the correcting operation of the machine, said handle continually tending to move from its correcting position to its normal position when displaced therefrom; a stop to prevent such movement; and mechanism including a part traveling with the carriage and operative at a predetermined location thereof to release the handle from said stop.

3. In a calculating machine; a carriage to determine the place of calculation; a handle adapted to occupy a normal position for the normal operation of the machine, and a correcting position for the correcting operation of the machine, said handle continually tending to move from its correcting position to its normal position when displaced therefrom; a pawl to prevent such movement; and mechanism including a part traveling with the carriage and operative at a predetermined location thereof to release the handle from said pawl.

4. In a calculating machine; a carriage to determine the place of calculation; a handle adapted to occupy a normal position for the normal operation of the machine, and a correcting position for the correcting operation of the machine, said handle continually tending to move from its correcting position to its normal position when displaced therefrom; a pawl to prevent such movement; and mechanism including a projection on the carriage and operative at a predetermined location thereof to release the handle from said pawl.

5. In a calculating machine; a carriage to determine the place of calculation; a handle adapted to occupy a normal position for the normal operation of the machine, and a correcting position for the correcting operation of the machine; a spring continually tending to return the handle to its normal position when displaced therefrom; a pawl to prevent such movement; and mechanism including a projection on the carriage and operative at a predetermined location thereof to release the handle from said pawl.

6. In a calculating machine; a totalizer and master wheel moving relatively to each other; a handle adapted to occupy a normal position for the normal rotation of the master wheel, and a correcting position for the correcting rotation of the master wheel; and means including a part fixed relatively to the totalizer and therefore moving relatively to the master wheel, and operative upon the handle at a predetermined relative location of the totalizer to control the handle to move it from its correcting to its normal position.

7. In a calculating machine; a totalizer and master wheel traveling relatively to each other; a handle adapted to occupy a normal position for the normal operation of the machine, and a correcting position for the correcting operation of the machine, said handle continually tending to move from its correcting position to its normal position when displaced therefrom; a stop to prevent such movement; and mechanism including a part fixed relatively to the totalizer and operative at a predetermined location of the traveling part to release the handle from said stop.

8. In a calculating machine; a totalizer and master wheel traveling relatively to each other; a handle adapted to occupy a normal position for the normal operation of the machine, and a correcting position for the correcting operation of the machine, said handle continually tending to move from its correcting position to its normal position when displaced therefrom; a pawl to prevent such movement; and mechanism including a part fixed relatively to the totalizer and operative at a predetermined location of the traveling part to release the handle from said pawl.

9. In a calculating machine; a totalizer and master wheel traveling relatively to each other; a handle adapted to occupy a normal position for the normal operation of the machine and a correcting position for the correcting operation of the machine, said handle continually tending to move from its correcting position to its normal position when displaced therefrom; a pawl to prevent such movement; and mechanism including a projection on the totalizer and operative at predetermined location of the traveling part to release the handle from said pawl.

10. In a calculating machine; a totalizer and master wheel traveling relatively to each other; a handle adapted to occupy a normal position for the normal operation of the machine, and a correcting position for the correcting operation of the machine; a spring continually tending to return the handle to its normal position when displaced therefrom; a pawl to prevent such return; and mechanism including a projection on the totalizer and operative at a predetermined location of the traveling part to release the handle from said pawl.

11. In a calculating machine; a carriage to determine the place of calculation; a handle adapted to occupy an adding position for the adding operation of the machine, and a subtracting position for the subtracting operation of the machine; and means including a part moving with the carriage and operative at a predetermined location thereof to control the handle to move it from its subtracting position to its adding position.

12. In a calculating machine; a carriage to determine the place of calculation; a handle adapted to occupy an adding position for the adding operation of the machine, and a subtracting position for the subtracting operation of the machine, said handle continually tending to move from its subtracting position to its adding position when displaced therefrom; a stop to prevent such movement; and mechanism including a part traveling with the carriage and operative at a predetermined location thereof to release the handle from said stop.

13. In a calculating machine; a carriage to determine the place of calculation; a handle adapted to occupy an adding position for the adding operation of the machine, and a subtracting position for the subtracting operation of the machine, said handle continually tending to move from its subtracting position to its adding position when displaced therefrom; a pawl to prevent such movement; and mechanism including a part traveling with the carriage and operative at a predetermined location thereof to release the handle from said pawl.

14. In a calculating machine; a carriage to determine the place of calculation; a handle adapted to occupy an adding position for the adding operation of the machine, and a subtracting position for the subtracting operation of the machine, said handle continually tending to move from its subtracting position to its adding position when displaced therefrom; a pawl to prevent such movement; and mechanism including a projection on the carriage and operative at a predetermined location thereof to release the handle from said pawl.

15. In a calculating machine; a carriage to determine the place of calculation; a handle adapted to occupy an adding position for the adding operation of the machine, and a subtracting position for the subtracting operation of the machine; a spring to return the handle from its subtracting position to its adding position when displaced therefrom; a pawl to prevent such return; and mechanism including a projection on the carriage and operative at a predetermined location thereof to release the handle from said pawl.

16. In a calculating machine; a totalizer and master wheel moving relatively to each other; a handle adapted to occupy an adding position for the adding rotation of the master wheel, and a subtracting position for the subtracting rotation of the master wheel; and means including a part fixed relatively to the totalizer and therefore moving relatively to the master wheel, and operative upon the handle at a predetermined relative location of the totalizer to move the handle from its subtracting to its adding position.

17. In a calculating machine; a totalizer and master wheel traveling relatively to each other; a handle adapted to occupy an adding position for the adding operation of the machine and a subtracting position for the subtracting operation of the machine, said handle continually tending to move from its subtracting position to its adding position when displaced therefrom; a stop to prevent such movement; and mechanism including a part fixed relatively to the totalizer and operative at a predetermined location of the traveling part to release the handle from said stop.

18. In a calculating machine; a totalizer and master wheel traveling relatively to each other; a handle adapted to occupy an adding position for the adding operation of the machine, and a subtracting position for the subtracting operation of the machine, said handle continually tending to move from its subtracting position to its adding position when displaced therefrom; a pawl to prevent such movement; and mechanism including a part fixed relatively to the totalizer and operative at a predetermined location of the traveling part to release the handle from said pawl.

19. In a calculating machine; a totalizer and master wheel traveling relatively to each other; a handle adapted to occupy an adding position for the adding operation of the machine, and a subtracting position for the subtracting operation of the machine, said handle continually tending to move from its subtracting position to its adding position when displaced therefrom; a pawl to prevent such movement; and mechanism including a projection on the totalizer and operative at a predetermined location of the traveling part to release the handle from said pawl.

20. In a calculating machine; a totalizer and master wheel traveling relatively to each other; a handle adapted to occupy an adding position for the adding operation of the machine, and a subtracting position for the subtracting operation of the machine; a spring continually tending to return the handle to its adding position when displaced therefrom; a pawl to prevent such return; and mechanism including a projection on the totalizer and operative at a predetermined location of the traveling part to release the handle from said pawl.

In witness whereof, I have hereunto subscribed my name in the presence of two witnesses.

HYMAN ELI GOLDBERG.

Witnesses:
E. W. STOLZENBACH,
DAVID GOLDBERG.